United States Patent
Tseng et al.

(10) Patent No.: US 8,379,150 B2
(45) Date of Patent: Feb. 19, 2013

(54) DATA TRANSMISSION METHOD AND AUDIO/VIDEO SYSTEM CAPABLE OF SPLITTING AND SYNCHRONIZING AUDIO/VIDEO DATA

(75) Inventors: Cheng-Te Tseng, Taipei (TW); Chang-Hung Lee, Yun-Lin Hsien (TW)

(73) Assignee: Qisda Corporation, Taoyuan County (TW)

( * ) Notice: Subject to any disclaimer, the term of this patent is extended or adjusted under 35 U.S.C. 154(b) by 1114 days.

(21) Appl. No.: 12/057,378

(22) Filed: Mar. 28, 2008

(65) Prior Publication Data

US 2008/0240684 A1 Oct. 2, 2008

(30) Foreign Application Priority Data

Mar. 30, 2007 (TW) .............................. 96111460 A (51) Int. Cl.
*H04N 9/475* (2006.01)
(52) U.S. Cl. ...................... 348/515; 348/222.1; 709/219
(58) Field of Classification Search ............... 348/222.1, 348/239, 254, 723, 515–517; 709/217–231; 386/100
See application file for complete search history.

(56) References Cited

U.S. PATENT DOCUMENTS

| | | | | |
|---|---|---|---|---|
| 6,421,733 | B1 * | 7/2002 | Tso et al. | 709/246 |
| 6,487,603 | B1 * | 11/2002 | Schuster et al. | 709/231 |
| 7,116,874 | B2 * | 10/2006 | Brown et al. | 385/122 |
| 7,176,978 | B2 * | 2/2007 | Uchida et al. | 348/515 |
| 7,280,156 | B2 * | 10/2007 | Roelens | 348/512 |
| 7,602,980 | B2 * | 10/2009 | Yashiro et al. | 382/236 |
| 7,765,315 | B2 * | 7/2010 | Batson et al. | 709/231 |
| 7,812,886 | B2 * | 10/2010 | Uchida et al. | 348/515 |
| 7,920,209 | B2 * | 4/2011 | Mallinson | 348/515 |
| 7,944,484 | B2 * | 5/2011 | Strandwitz et al. | 348/222.1 |
| 7,996,750 | B2 * | 8/2011 | Wang et al. | 714/798 |

* cited by examiner

*Primary Examiner* — Annan Shang (57) ABSTRACT

Data transmission first initializes a transmitter system and a receiver system. The transmitter system processes audio/video data, and transmits the processed audio/video data based on information received from the receiver system. The receiver system receives and processes the audio/video data sent by the transmitter system for generating corresponding audio output data and video output data. The receiver system sends the audio output data and the video output data to an audio output apparatus and a video output apparatus, respectively.

20 Claims, 8 Drawing Sheets

DATA TRANSMISSION METHOD AND AUDIO/VIDEO SYSTEM CAPABLE OF SPLITTING AND SYNCHRONIZING AUDIO/VIDEO DATA

BACKGROUND OF THE INVENTION

1. Field of the Invention

The present invention relates to a data transmission method and audio/video system, and more particularly, to a data transmission method and audio/video system capable of splitting and synchronizing audio/video data.

2. Description of the Prior Art

Audio and video transmission techniques have wide applications and functions, and are usually applied in audio and video systems, such as a security monitoring system, a projector, or a home theater system. Prior art audio and video systems generally adopt data transmission techniques, such as synchronous, merged audio/video data or asynchronous, split audio/video data.

The security monitoring system usually includes a plurality of monitors and a monitoring center, and the projector is regularly used in a large conference or group presentation. If, in the middle of the conference or the presentation, the presenter changes his position, the computer and the projector may require plugging, unplugging, or turning on and off for a traditional cable projector, which not only wastes time, but also causes inconvenience of use. With the popularity of wireless networking, e.g. wireless fidelity and WiFi, and speed enhancements of embedded central processing units (embedded CPUs), wireless projectors are also becoming more and more popular. The wireless projector links wirelessly to each participant's computer, and thus the presentation can be switched among many presenters at any time, without needing to unplug the connecting line of the screen repeatedly.

Figure 1:
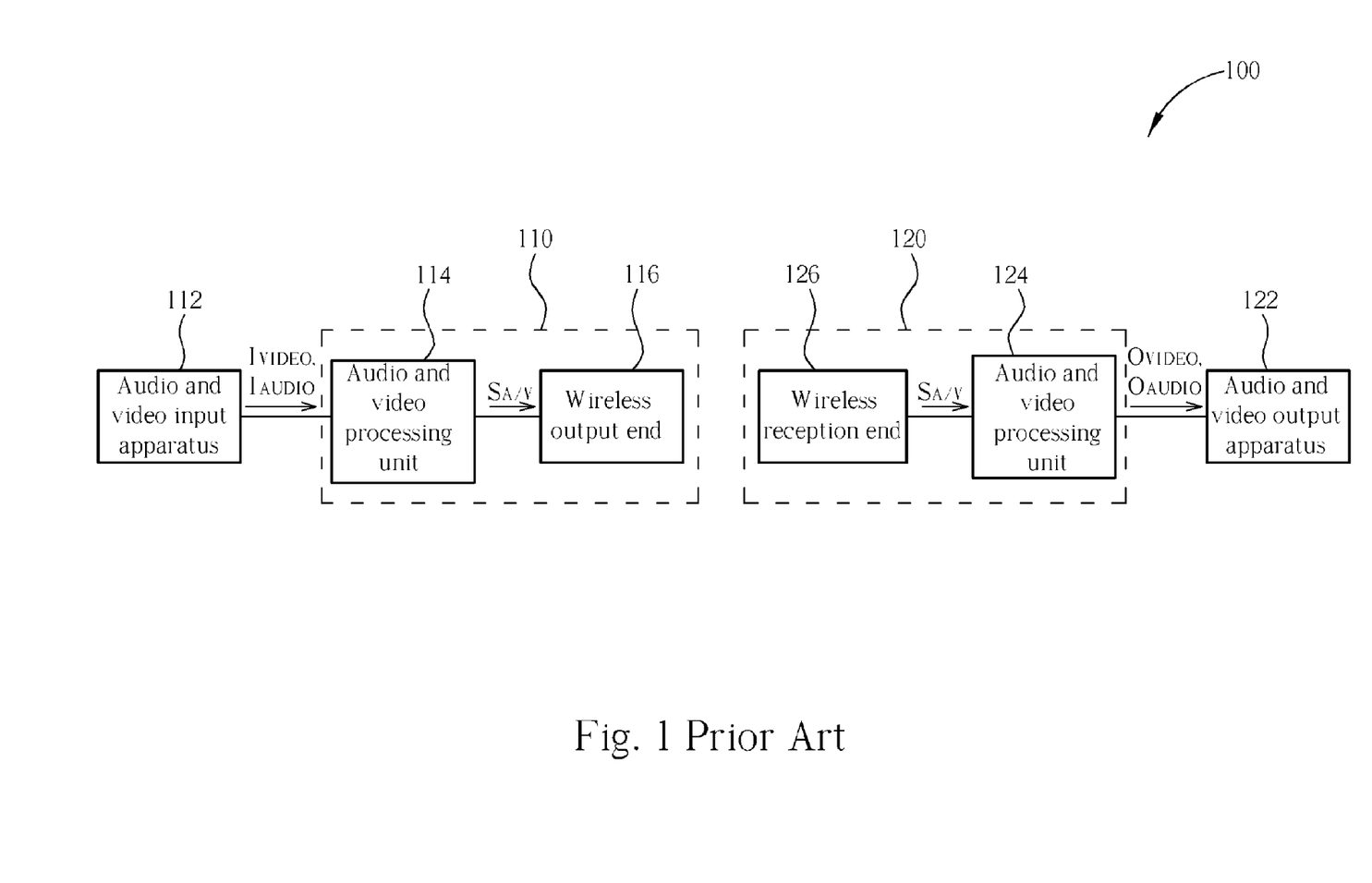
FIG. 1 is a functional block diagram of a prior art audio and video system.

Please refer to FIG. 1. FIG. 1 is a functional block diagram of a prior art audio and video system 100. The video and audio system 100 utilizes the data transmission technique capable of synchronizing and merging audio/video data, and includes a wireless transmitter system 110 and a wireless receiver system 120. The wireless transmitter system 110 can receive video input data $I_{VIDEO}$ and audio input data $I_{AUDIO}$ from an audio and video input apparatus 112, utilize an audio and video processing unit 114 for performing operations such as compression and coding for the video input data $I_{VIDEO}$ and the audio input data $I_{AUDIO}$ to generate a corresponding audio and video data stream $S_{A/V}$, and finally can output the audio and video data stream $S_{A/V}$ through a wireless output end 116. The wireless receiver system 120 can receive the audio and video data stream $S_{A/V}$ transmitted from the wireless transmitter system 110 through a wireless reception end 126, utilize an audio and video processing unit 124 for performing operations such as decompression and decoding for the audio and video data stream $S_{A/V}$ to generate corresponding video output data $O_{VIDEO}$ and audio output data $O_{AUDIO}$, and finally can output the video output data $O_{VIDEO}$ and the audio output data $O_{AUDIO}$ to an audio and video output apparatus 122. With the audio/video synchronization structure utilized in the prior art audio and video system 100, the audio data and the video data are merged for wireless output during transmission, and thus only the processing approach for the audio and video data in the same receiver system need be considered. If the audio and video input apparatus 112 is a monitor, and the audio and video output apparatus 122 is a display of a monitoring center, the audio and video system 100 can be a security monitoring system; and if the audio and video input apparatus 112 is a notebook computer, and the audio and video output apparatus 122 is a wireless projector, the audio and video system 100 can be a data projection system.

On the other hand, as the bandwidth of the wireless network increases (for example, two wireless network standards: IEEE 802.11a and IEEE 802.11g), applications of the wireless projector gradually evolve from the wireless data projector for the office, conferences and group presentations, to a wireless video projector for a home theater system. In the home theater system, users output video signals through the projector and audio signals to a speaker set.

Figure 2:
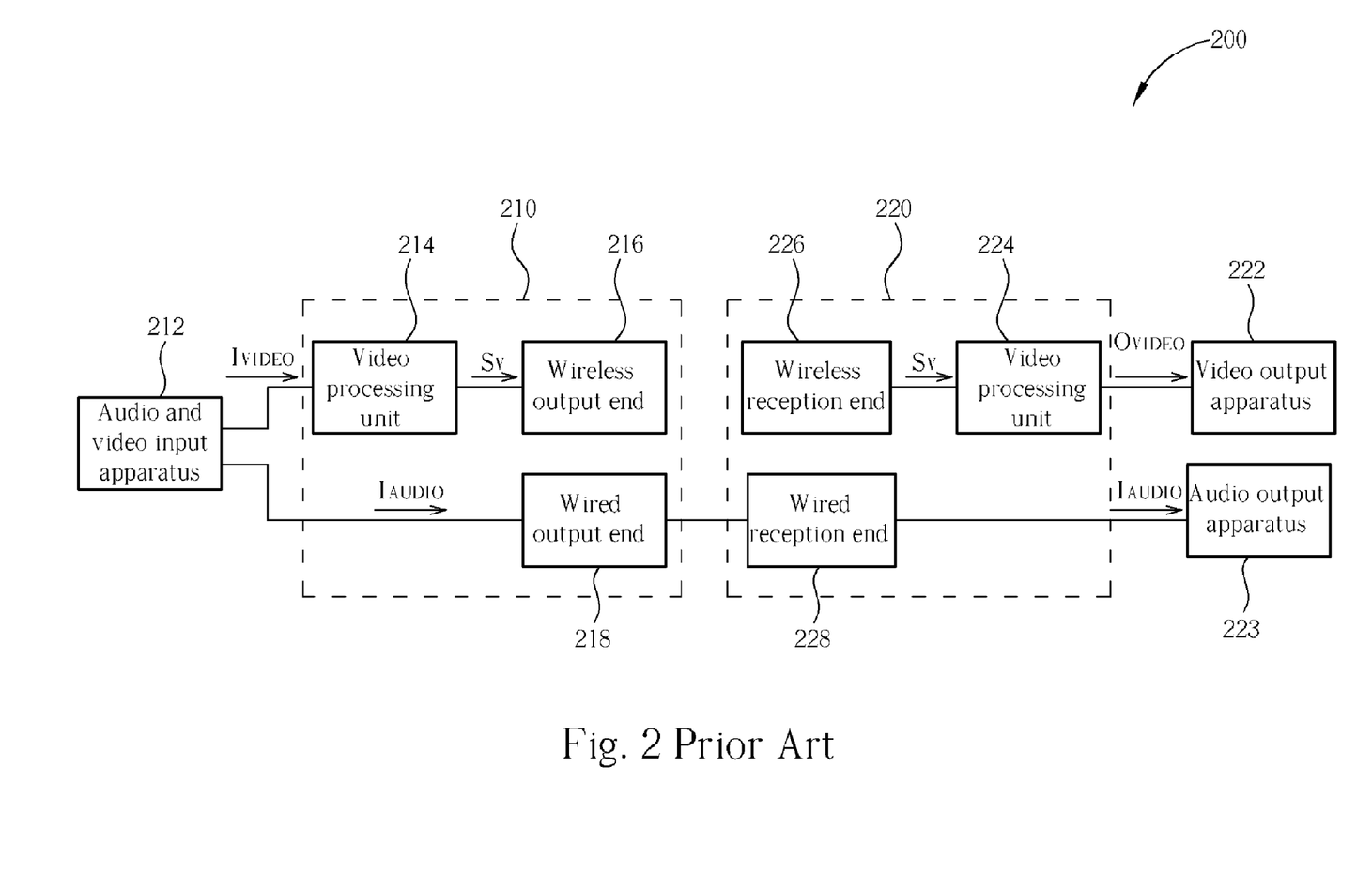
FIG. 2 is a functional block diagram of another prior art audio and video system.

Please refer to FIG. 2. FIG. 2 is a functional block diagram of a prior art audio and video system 200. The audio and video system 200 utilizes the asynchronous data transmission technique with split audio/video data, and includes a wireless transmitter system 210 and a wireless receiver system 220. The wireless transmitter system 210 can receive video input data $I_{VIDEO}$ and audio input data $I_{AUDIO}$ from an audio and video input apparatus 212, and can utilize a video processing unit 214 for performing operations such as compression and coding for the video input data $I_{VIDEO}$ to generate a corresponding video data stream $S_V$. Finally, the wireless transmitter system 210 can respectively output the video data stream $S_V$ and the audio input data $I_{AUDIO}$ through a wireless output end 216 and a wired output end 218 at the same time. The wireless receiver system 220 can respectively receive the video data stream $S_V$ transmitted from the wireless transmitter system 210 and the audio input data $I_{AUDIO}$ through a wireless reception end 226 and a wired reception end 228, and can utilize a video processing unit 224 for performing operations such as decompression and decoding for the video data stream $S_V$ to generate corresponding video output data $O_{VIDEO}$. Finally, the wireless receiver system 220 can output the video output data $O_{VIDEO}$ and the audio input data $I_{AUDIO}$ to a video output apparatus 222 and an audio output apparatus 223, respectively. The audio and video system 200 of the present invention can be a home theater system, and the video output apparatus 222 and the audio output apparatus 223 can be a projector and a speaker set, respectively. With the asynchronous and splitting structure for transmitting the audio/video data, the video data and the audio data are split to output wirelessly and over wires, respectively, and during data transmission, the video data stream $S_V$ may suffer interference to different extents, such that the video data stream $S_V$ and the audio input data $I_{AUDIO}$ received by the receiver system 220 can not be synchronized to each other.

SUMMARY OF THE INVENTION

It is therefore a primary objective of the present invention to provide a data transmission method and audio/video system capable of splitting and synchronizing audio/video data.

The present invention discloses a data transmission method for a transmitter system and a receiver system splitting and synchronizing audio/video data, wherein the transmitter system comprises a first video data buffer. The method comprising the steps of initializing a transmitter system and a receiver system for obtaining a predetermined compression ratio and a first predetermined capacity corresponding to the first video data buffer in the transmitter system; processing the video data to form processed video data according to the predetermined compression ratio and the first predetermined capacity in the transmitter system and transmitting the processed video data according to a video data playing notification message received from the receiver system; processing the audio data in the transmitter system and transmitting the audio data according to a deviation signal and the video data playing notification message received from the receiver system; receiving and processing the processed video data and the audio data in the receiver system for generating corresponding video output data and audio output data; and outputting the video output data from the receiver system to a video output apparatus and outputting the audio output data from the receiver system to an audio output apparatus.

The present invention further discloses a video and audio system capable of splitting and synchronizing audio/video data. The video and audio system includes a transmitter system and a receiver system. The transmitter system includes a first video processing unit for receiving video data from a video and audio input apparatus and processing the video data to form processed video data according to a predetermined compression ratio, a first audio processing unit for receiving and processing audio data from the video and audio input apparatus, a first video data buffer for storing the processed video data, a first wireless unit for transmitting the processed video data wirelessly, a first wired unit for transmitting the audio data on wire, and a control device for controlling transmission of the processed video data and the audio data. The receiver system includes a second wireless unit for receiving the processed video data wirelessly from the transmitter system, a second wired unit for receiving the audio data on wire, a second video processing unit for processing the processed video data to generate corresponding video output data, and a second audio processing unit for processing the audio data to generate corresponding audio output data. The receiver system further generates and transmits a deviation signal to the transmitter system according to data time of the video output data and data time of the audio output data.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a data transmission method, and an audio and video system capable of splitting and synchronizing audio and video data, which can provide audio and video synchronization when the audio data and the video data are transmitted from the same source and played in different systems. The method of the present invention includes initializing a transmitter system and a receiver system of the audio and video system and activating synchronized playback of the audio and video data.

Figure 3:
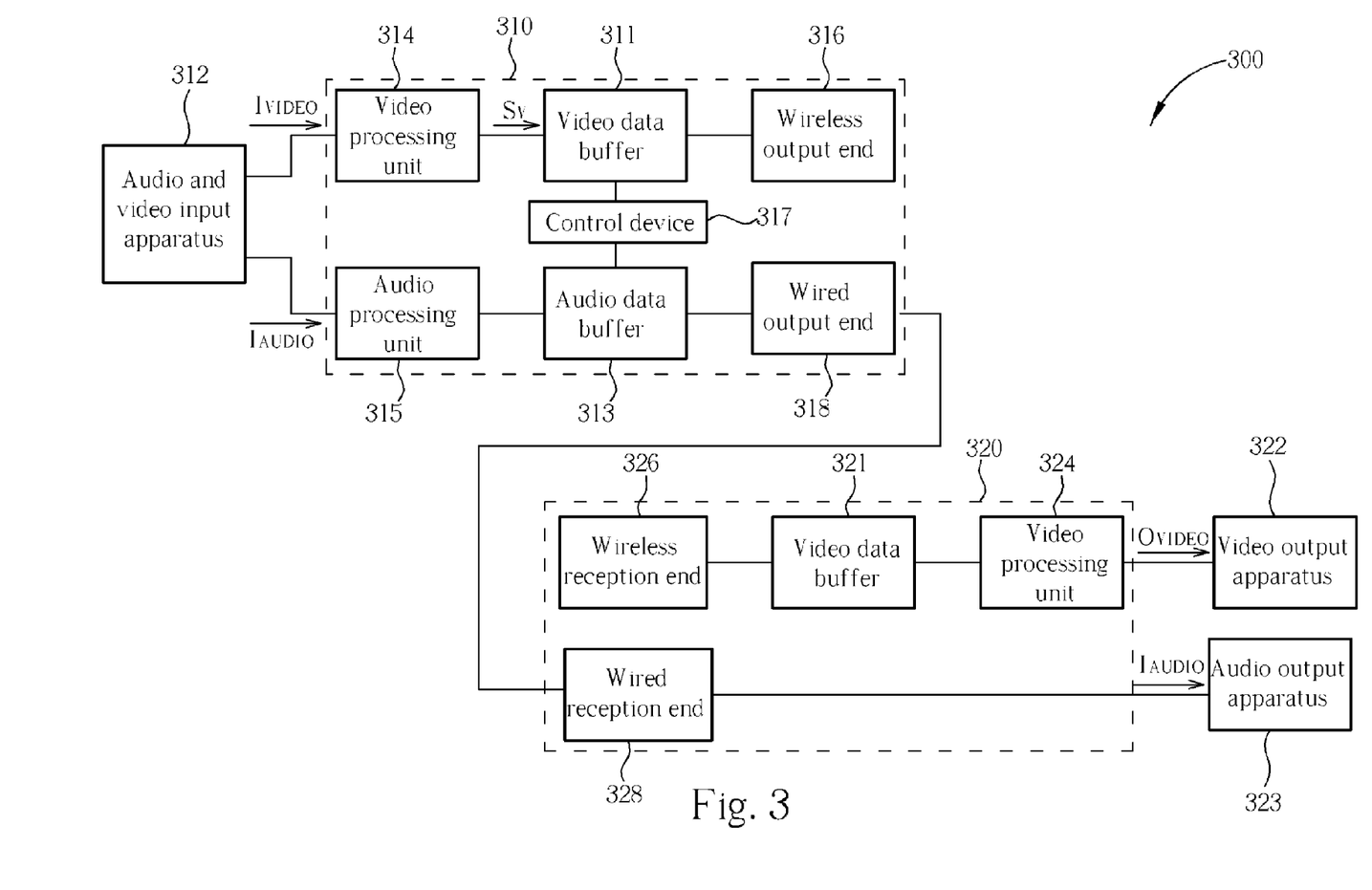
FIG. 3 is a functional block diagram of an audio and video system of the present invention.

Please refer to FIG. 3. FIG. 3 is a functional block diagram of an audio and video system 300 of the present invention. The audio and video system 300 utilizes a data transmission method capable of splitting and synchronizing audio and video data, and includes a transmitter system 310 and a receiver system 320. The transmitter system 310 can receive video input data $I_{VIDEO}$ and audio input data $I_{AUDIO}$ from an audio and video input apparatus 312. A video processing unit 314 can perform operations such as compression and coding for the video input data $I_{VIDEO}$ to generate a corresponding video data stream $S_V$. Then, the video data stream $S_V$ can be stored in a video data buffer 311. An audio processing unit 315 controls data flow and timing when outputting the audio input data $I_{AUDIO}$. A control device 317 of the transmitter system 310 calculates data quantity of the video data buffer 311 and an audio data buffer 313. When the data quantity of the video data buffer 311 lies in a predetermined range, the video data stream $S_V$ can be outputted through a wireless output end 316; and, when the data quantity of the audio data buffer 313 lies in a predetermined range, the audio input data $I_{AUDIO}$ can be outputted by a wired output end 318.

The receiver system 320 can respectively receive the video data stream $S_V$ and the audio input data $I_{AUDIO}$ transmitted from the wireless transmitter system 310 through a wireless reception end 326 and a wired reception end 328, and then the video data stream $S_V$ is stored in a video data buffer 321. When the data quantity of the video data buffer 321 lies in the predetermined range, a video processing unit 324 can perform operations such as decompression and decoding for the video data stream $S_V$ to generate corresponding video output data $O_{VIDEO}$. Finally, the video output data $O_{VIDEO}$ and the audio input data $I_{AUDIO}$ are transmitted to a video output apparatus 322 and an audio output apparatus 323, respectively. Certainly, the receiver system 320 can further include an audio processing unit (not shown in FIG. 3) coupled to the wired reception end 328 for processing the audio input data $I_{AUDIO}$ to generate corresponding audio output data to the audio output apparatus 323.

The audio and video system 300 of the present invention can be a home theater system, and the video output apparatus 322 and the audio output apparatus 323 can be a projector and a speaker set, respectively. With the asynchronous and splitting structure for transmitting audio/video data, the video data and the audio data are split to output wirelessly and over wire, respectively, and during transmission, the video data stream $S_V$ may suffer interference to different extents, such that the video data stream $S_V$ and the audio input data $I_{AUDIO}$ received by the receiver system 320 can not be synchronized to each other. Therefore, in the present invention, the receiver system 320 of the audio and video system 300 utilizes the video processing unit 314, the audio processing unit 315 and the control device 317 for controlling and adjusting parameters such as transmission time, data flow, and compression ratio of the audio/video data according to actual received data and time of the receiver system 320. Thus, the video output data $O_{VIDEO}$ played by the video output apparatus 322 and the audio input data $I_{AUDIO}$ played by the audio output apparatus 323 can be synchronized to each other.

Figure 4:
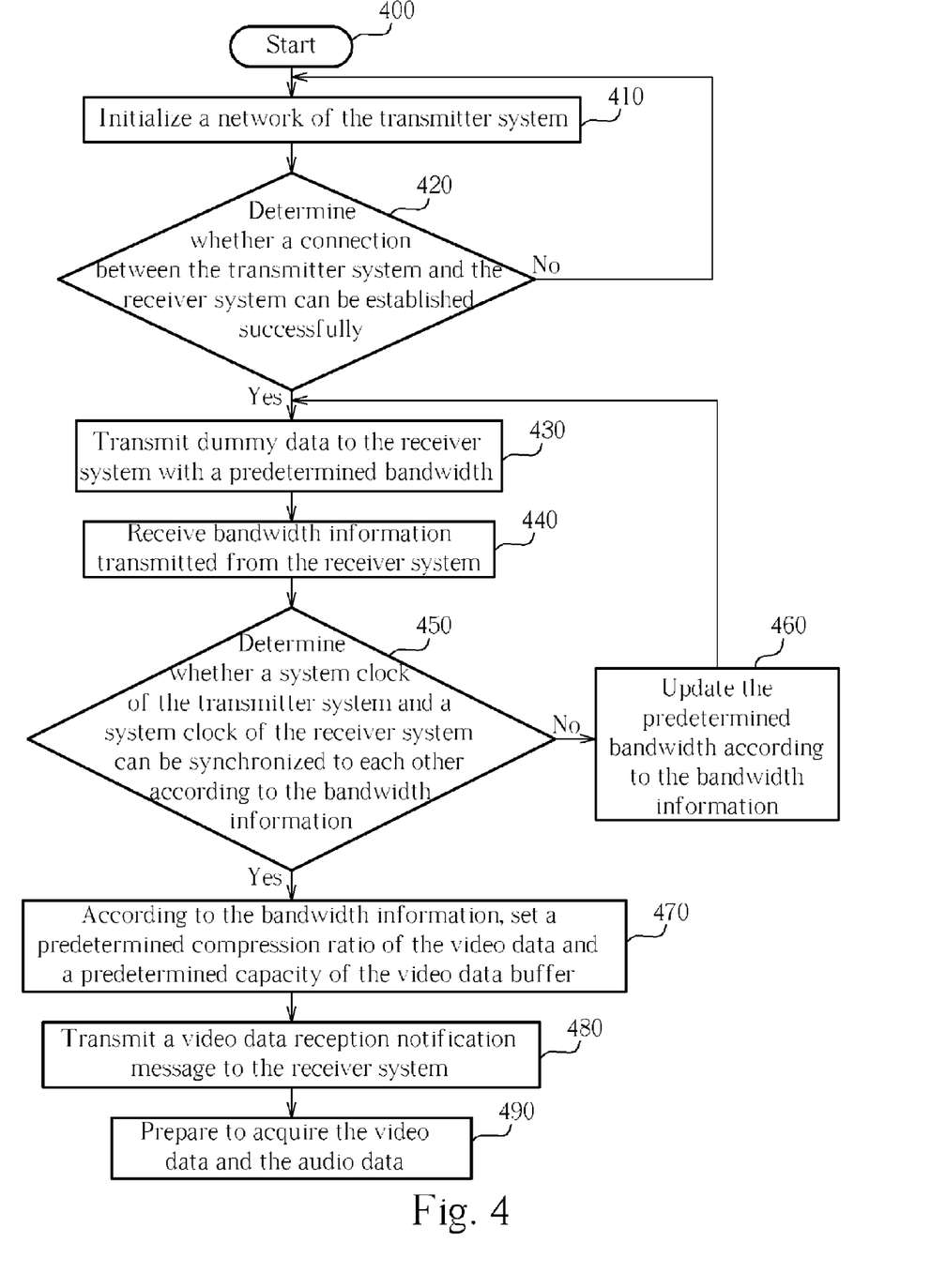
FIG. 4 is a flow chart of a process for initializing a transmitter system in the audio and video system of the present invention.

Please refer to FIG. 4. FIG. 4 is a flow chart of a process 40 for initializing the transmitter system 310 of the audio and video system 300 of the present invention. The process 40 includes the following steps:

Step 400: Start.

Step 410: Initialize a network of the transmitter system 310.

Step 420: Determine whether a connection between the transmitter system 310 and the receiver system 320 can be established successfully. If so, proceed to Step 430; if not, proceed to Step 410.

Step 430: Transmit dummy data to the receiver system 320 with a predetermined bandwidth.

Step 440: Receive bandwidth information transmitted from the receiver system 320.

Step 450: Determine whether a system clock of the transmitter system 310 and a system clock of the receiver system 320 can be synchronized to each other according to the bandwidth information. If so, proceed to Step 470; if not, proceed to Step 460.

Step 460: Update the predetermined bandwidth according to the bandwidth information, and proceed to Step 430.

Step 470: According to the bandwidth information, set a predetermined compression ratio of the video data and a predetermined capacity of the video data buffer 311.

Step 480: Transmit a video data reception notification message to the receiver system 320.

Step 490: Prepare to acquire the video data and the audio data.

Figure 5:
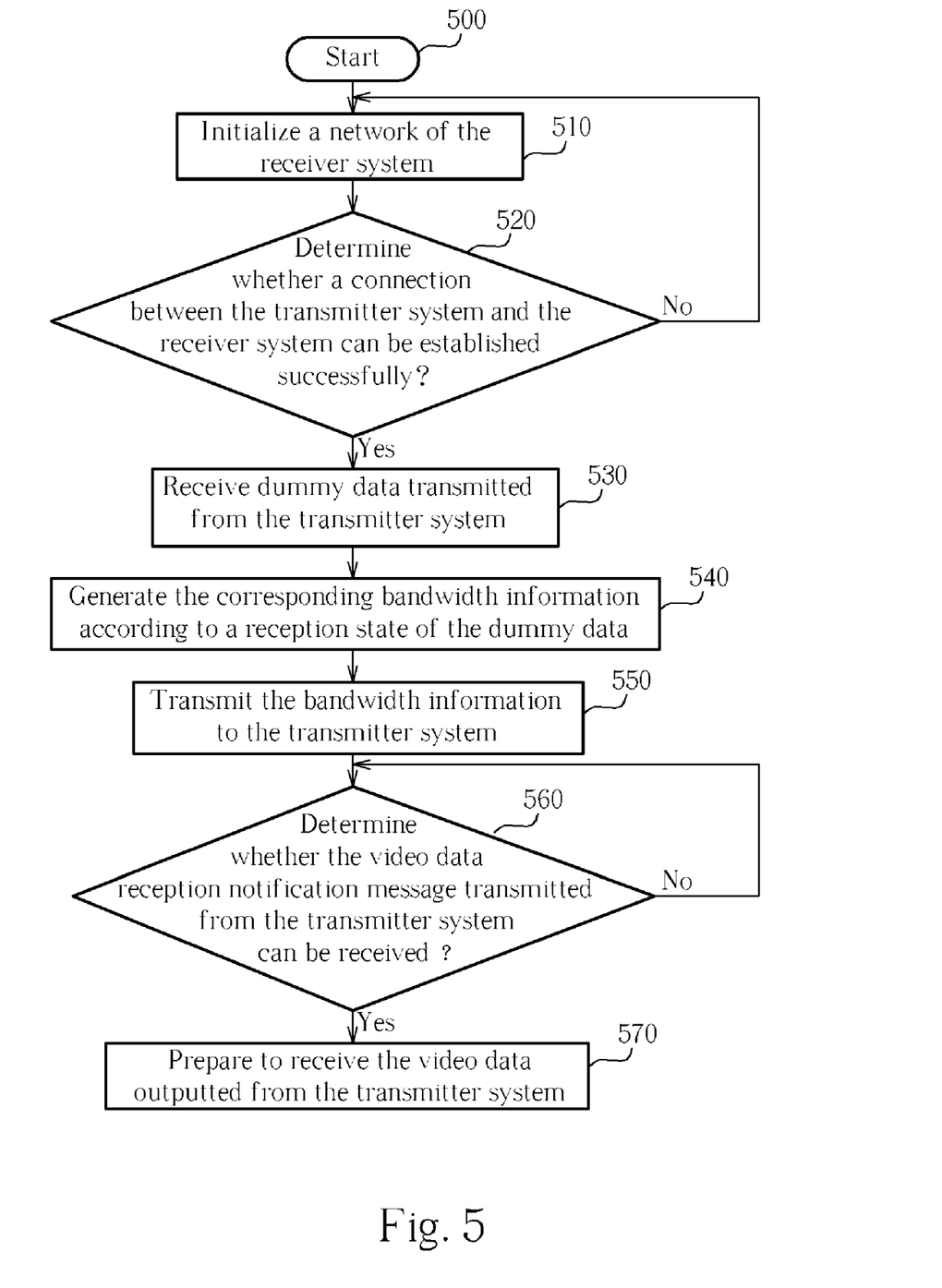
FIG. 5 is a flow chart of a process for initializing a receiver system in the audio and video system of the present invention.

Please refer to FIG. 5. FIG. 5 is a flow chart of a process 50 for initializing the receiver system 320 of the audio and video system 300 of the present invention. The process 50 includes the following steps:

Step 500: Start.

Step 510: Initialize a network of the receiver system 320.

Step 520: Determine whether a connection between the transmitter system 310 and the receiver system 320 can be established successfully. If so, proceed to Step 530; if not, proceed to Step 510.

Step 530: Receive dummy data transmitted from the transmitter system 310.

Step 540: Generate the corresponding bandwidth information according to a reception state of the dummy data.

Step 550: Transmit the bandwidth information to the transmitter system 310.

Step 560: Determine whether the video data reception notification message transmitted from the transmitter system 310 can be received. If so, proceed to Step 570; if not, proceed to Step 560.

Step 570: Prepare to receive the video data outputted from the transmitter system 310.

First, the present invention initializes the network of the transmitter system 310 and the receiver system 320 in Steps 410 and 510, and determines whether the connection can be established between the transmitter system 310 and the receiver system 320 of the audio and video system 300 in Steps 420 and 520. When the connection between the transmitter system 310 and the receiver system 320 is already established successfully, the present invention then determines whether the system clock of the transmitter system 310 and the receiver system 320 are synchronized to each other, and determines the predetermined bandwidth when transmitting data. At first, the transmitter system 310 transmits the dummy data with the predetermined bandwidth in Step 430. Then, the receiver system 320 receives the dummy data in Step 530, and generates the corresponding bandwidth information according to the reception state of the dummy data in Step 540. For example, the transmitter system 310 transmits 100 packets each having 8000 bits in 100 microseconds, but the receiver system 320 only receives 90 correct packets each having 8000 bits after 100 microseconds. In this case, the receiver system 320 can calculate the corresponding bandwidth information according to the packet transmission time, the packet bit length and the number of successfully received packets in Step 540, and the transmitter system 310 can then adjust the number and the bit length of the packets being transmitted according to the bandwidth information until all of the transmitted packets can be received correctly by the receiver system 320. For example, after the predetermined bandwidth is updated in Step 460, the transmitter system 310 can only transmit 90 packets each having 8000 bits or 100 packets each having 7000 bits in 100 microseconds, and if the receiver system 320 can also receive the packets with the same number correctly after 100 microseconds and return the corresponding bandwidth information accordingly, the synchronization of the system clock between the transmitter system 310 and the receiver system 320 and the determination of the predetermined bandwidth are completed. At this time, the transmitter system 310 is finished with the preparation for acquiring the video data and the audio data, and the receiver system 320 is finished with the preparation for receiving the video data and the audio data as well.

Figure 6:
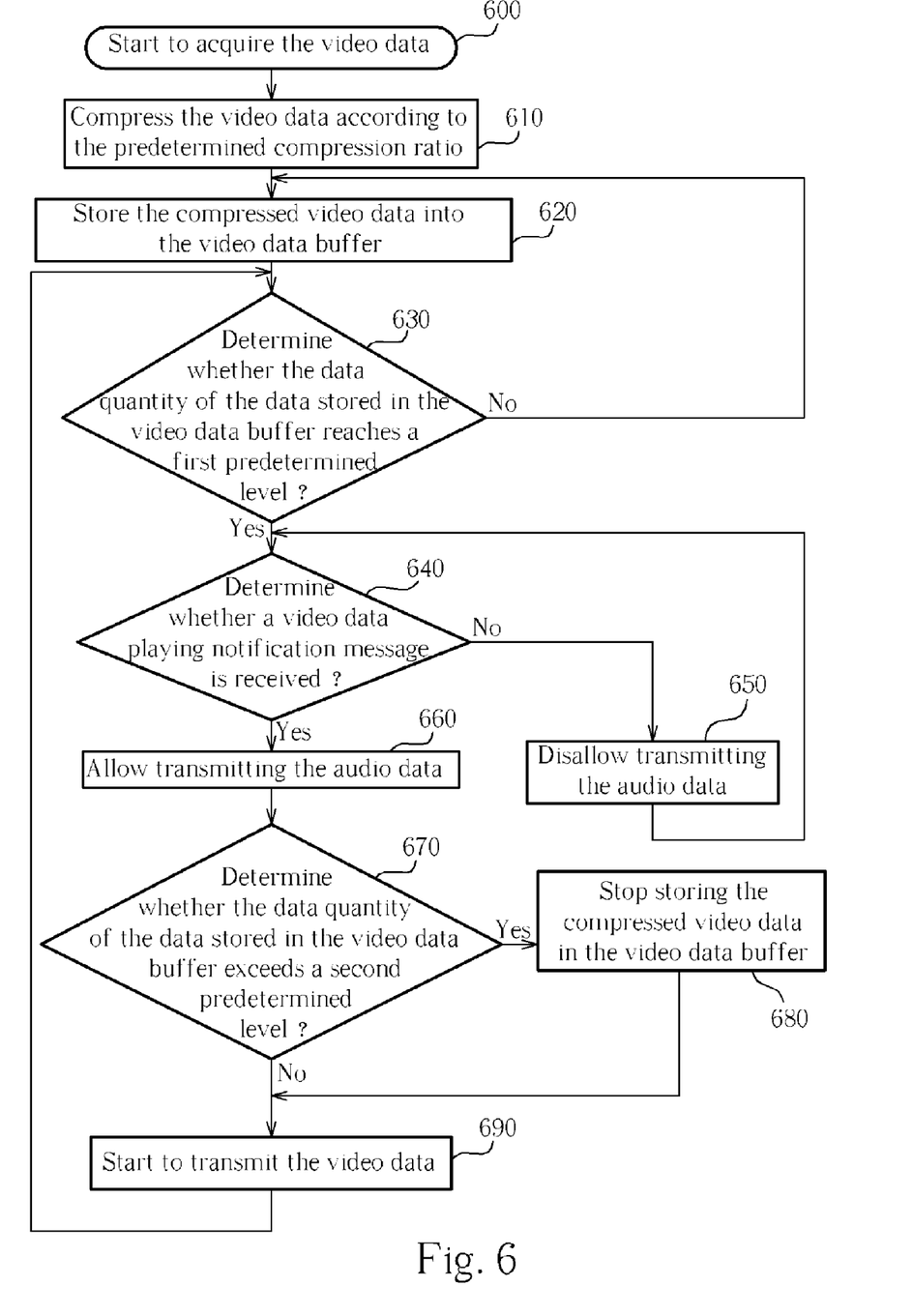
FIG. 6 is a flow chart diagram of a process for processing video data in the transmitter system of the present invention.

Please refer to FIG. 6. FIG. 6 is a flow chart diagram of a process 60 for processing the video data in the transmitter system 310 of the present invention. The process 60 includes the following steps:

Step 600: Start to acquire the video data.

Step 610: Compress the video data according to the predetermined compression ratio.

Step 620: Store the compressed video data into the video data buffer 311.

Step 630: Determine whether the data quantity of the data stored in the video data buffer 311 reaches a first predetermined level. If so, proceed to Step 640; if not, proceed to Step 620.

Step 640: Determine whether a video data playing notification message is received. If so, proceed to Step 660; if not, proceed to Step 650.

Step 650: Disallow transmitting the audio data, and proceed to Step 640.

Step 660: Allow transmitting the audio data, and proceed to Step 670.

Step 670: Determine whether the data quantity of the data stored in the video data buffer 311 exceeds a second predetermined level. If so, proceed to Step 690; if not, proceed to Step 680.

Step 680: Stop storing the compressed video data in the video data buffer 311, and proceed to Step 690.

Step 690: Start to transmit the video data, and proceed to Step 630.

Figure 7:
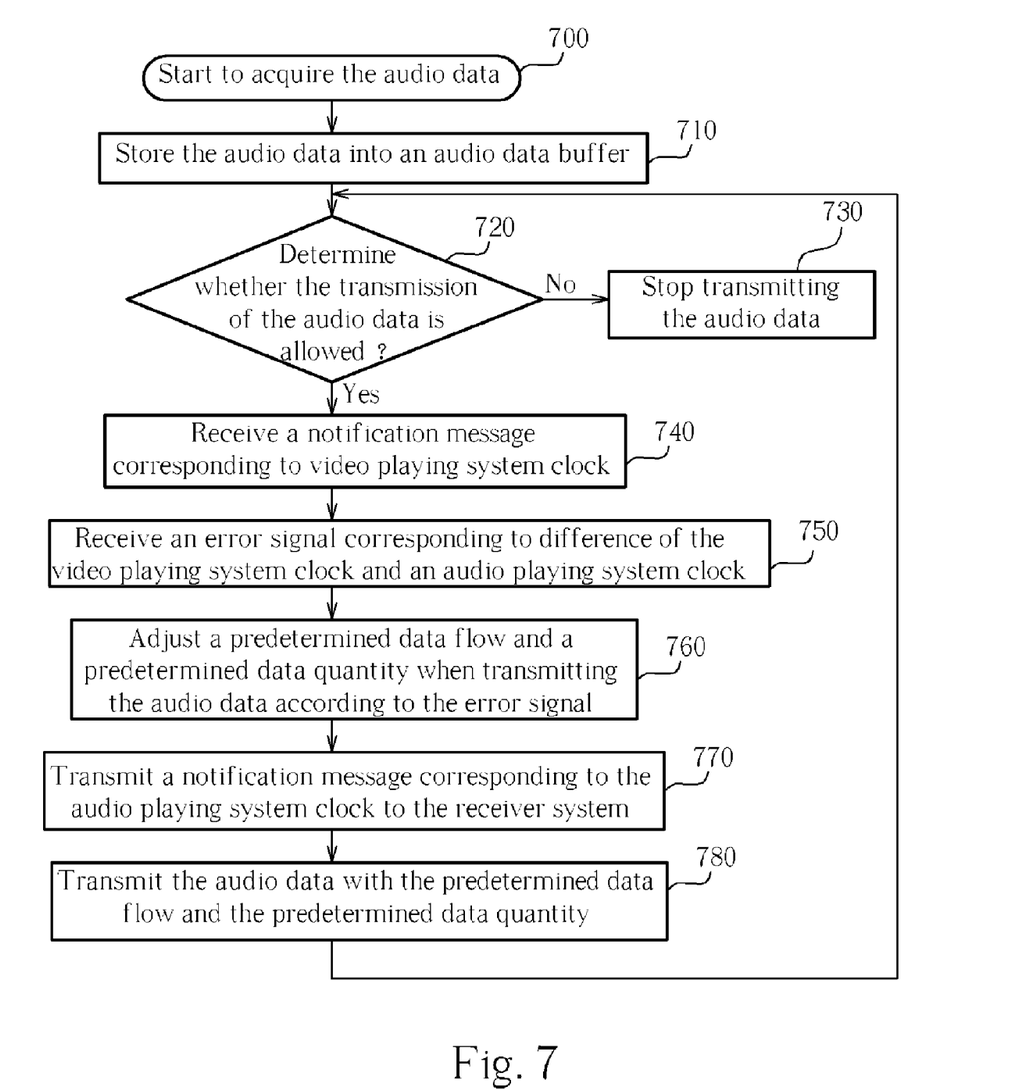
FIG. 7 is a flow chart diagram of a process for processing audio data in the transmitter system of the present invention.

Please refer to FIG. 7. FIG. 7 is a flow chart diagram of a process 70 for processing the audio data in the transmitter system 310 of the present invention. The process 70 includes the following steps:

Step 700: Start to acquire the audio data.

Step 710: Store the audio data into an audio data buffer 313.

Step 720: Determine whether the transmission of the audio data is allowed. If so, proceed to Step 740; if not, proceed to Step 730.

Step 730: Stop transmitting the audio data, and proceed to Step 720.

Step 740: Receive a notification message corresponding to video playing system clock.

Step 750: Receive an deviation signal corresponding to difference of the video playing system clock and an audio playing system clock.

Step 760: Adjust a predetermined data flow and a predetermined data quantity when transmitting the audio data according to the deviation signal.

Step 770: Transmit a notification message corresponding to the audio playing system clock to the receiver system 320.

Step 780: Transmit the audio data with the predetermined data flow and the predetermined data quantity, and proceed to Step 720.

Figure 8:
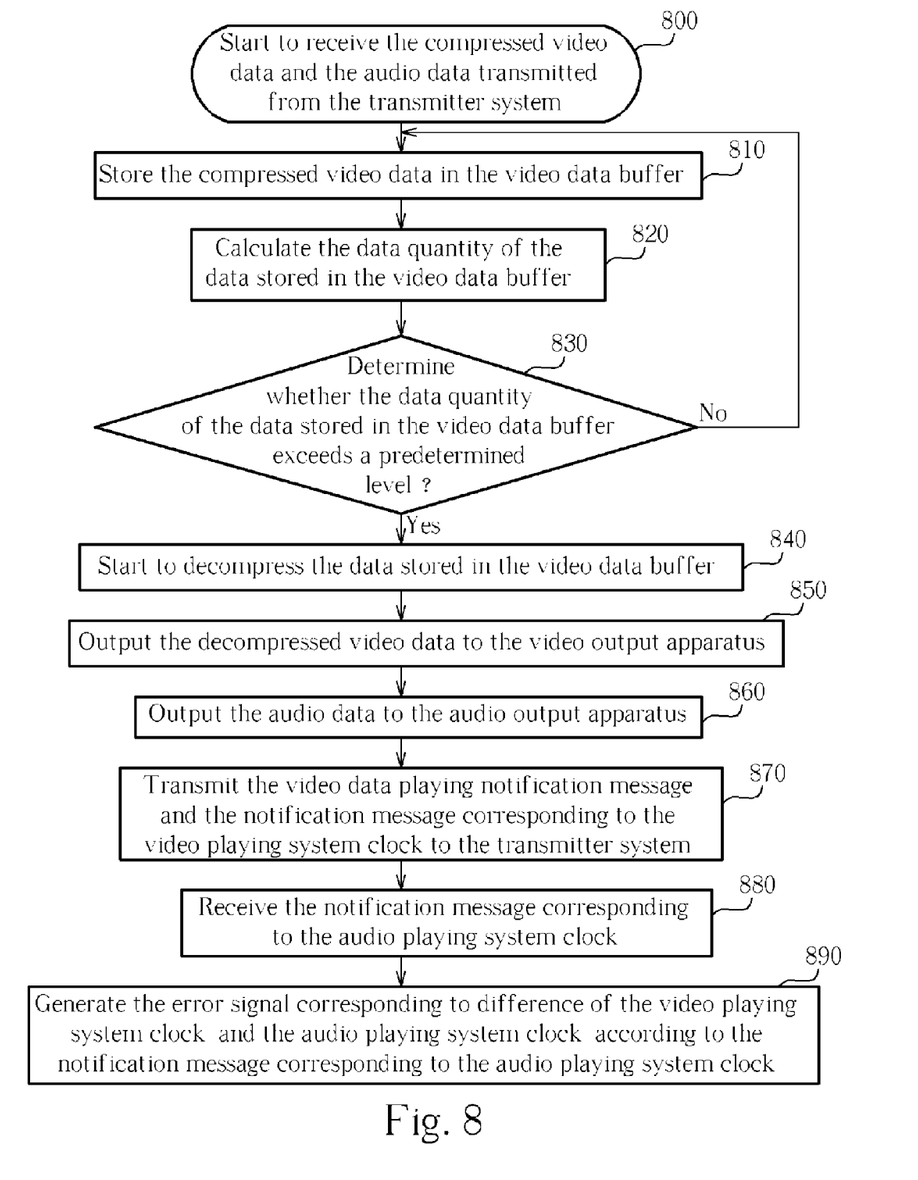
FIG. 8 is a flow chart diagram of a process for processing the video data and the audio data in the receiver system of the present invention.

Please refer to FIG. 8. FIG. 8 is a flow chart diagram of a process 80 for processing the video data and the audio data in the receiver system 320 of the present invention. The process 80 includes the following steps:

Step 800: Start to receive the compressed video data and the audio data transmitted from the transmitter system 310.

Step 810: Store the compressed video data in the video data buffer 321.

Step 820: Calculate the data quantity of the data stored in the video data buffer 321.

Step 830: Determine whether the data quantity of the data stored in the video data buffer 321 exceeds a predetermined level. If so, proceed to Step 840; if not, proceed to Step 810.

Step 840: Start to decompress the data stored in the video data buffer 321.

Step 850: Output the decompressed video data to the video output apparatus 322.

Step 860: Output the audio data to the audio output apparatus 323.

Step 870: Transmit the video data playing notification message and the notification message corresponding to the video playing system clock to the transmitter system 310.

Step 880: Receive the notification message corresponding to the audio playing system clock.

Step 890: Generate the deviation signal corresponding to difference of the video playing system clock and the audio playing system clock according to the notification message corresponding to the audio playing system clock.

After the present invention completes the initialization of the audio and video system 300, the transmitter system 310 can then start to process the video data and the audio data (as shown in FIG. 6 and FIG. 7). With regard to the video data, after acquiring the video data in Step 600, the transmitter system 310 then compresses the video data in Step 610, and stores the compressed video data into the video data buffer 311 in Step 620. A control device 317 of the transmitter system 310 can determine the data quantity of the data stored in the video data buffer 311 in Step 630 and 670, and can determine whether the video data playing notification message is received in Step 640. If the data quantity of the data stored in the video data buffer 311 has not reached the first predetermined level yet, the transmitter system 310 performs Step 620 to continue storing the compressed video data in the video data buffer 311; and, if the data quantity of the data stored in the video data buffer 311 reaches the first predetermined level and the video data playing notification message is received, the transmitter system 310 then performs Step 660 for allowing transmission of the audio data. Conversely, if the data quantity of the data stored in the video data buffer 311 reaches the first predetermined level but the video data playing notification message is not received, the transmitter system 310 performs Step 650 for disallowing transmission of the audio data. After the transmission of the audio data is allowed, if the data quantity of the data stored in the video data buffer 311 exceeds the second predetermined level, the transmitter system 310 then performs Step 680 for stopping storing of the compressed video data into the video data buffer 311. Next, Step 690 can be performed for starting to transmit the video data. If the data quantity of the data stored in the video data buffer 311 does not exceed the second predetermined level, Step 690 is directly performed for starting to transmit the video data.

On the other hand, with regard to the audio data, after acquiring the audio data in Step 700, the audio data can be stored in the audio data buffer 313 in Step 710. If the control device 317 of the transmitter system 310 determines to allow transmission of the audio data in Step 720, the notification message corresponding to the video playing system clock and the deviation signal corresponding to difference of the video playing system clock and the audio playing system clock can then be received from the receiver system 320. Thus, the transmitter system 310 can obtain the system clock difference when the audio data and the video data are played in the receiver system 320, and can adjust the predetermined data flow and the predetermined data quantity when transmitting the audio data in Step 760, such that the playback of the audio data and the video data can be synchronized in the receiver system 320.

In the present invention, after the transmitter system 310 of the audio and video system 300 completes the processing and the transmission of the audio data and the video data (as shown in FIG. 6 and FIG. 7), the receiver system 320 can then start to receive the video data and the audio data (as shown in FIG. 8). At first, the receiver system 320 stores the received video data in the video data buffer 321 in Step 810, and calculates the data quantity of the data stored in the video data buffer 321 in Step 820. If the data quantity of the data stored in the video data buffer 321 reaches the predetermined level, the receiver system 320 can perform Step 840 for decompressing and decoding the video data, and can perform Step 850 and 860 for synchronizing the video data played on the video output apparatus 322 and the audio data played on the audio output apparatus 323.Finally, the receiver system 320 can perform Step 870 to Step 890 for updating the real system clock to the transmitter system 310, so that the transmitter system 310 can instantaneously adjust the output of the audio data and the video data according to the data reception state of the receiver system 320.

Assume that the original video data includes F image frames outputted each second, of which the data quantity can be represented by R. Compressing the video data according to the predetermined compression ratio in Step 610 is compressing every M image frames into 1 I frame and (M−1) P frames, wherein the data quantity of the I frame is greater than that of the P frame and the compression ratio of the I frame and the P frame are represented by ri and rp, respectively. Thus, the data quantity of one I frame is R/ri, the data quantity of one P frame is R/rp, the data quantity of the original video data is R, and the data quantity of the compressed video data R' can be expressed by the following formula:

$$R'=(F/M)*((R/ri)+(R/rp)*(M-1))$$

If the video data buffer 311 of the transmitter system 310 needs to have at least a capacity of m image frames, and m is regularly set to be less than M (i.e. m<M), the capacity of the video data buffer 311 has to lie between RV_MIN and RV_MAX, among which RV_MIN corresponds to the data quantity of m P frames, RV_MAX corresponds to the data quantity of (m−1) P frames and 1 I frame, and can be represented by the following formulas:

$$RV\_MIN=m*R/rp;$$

$$RV\_MAX=R/ri+(m-1)*R/rp$$

On the other hand, the video data buffer 321 of the receiver system 320 has to provide a buffering time of at least 2 image frames, of which one frame is during transmission and reception and the other is during the decompression process. Thus, the capacity of the video data buffer 321 of the receiver system 320 has to lie between BV_MIN and BV_MAX, among which BV_MIN corresponds to the data quantity of 2

P frames, BV_MAX corresponds to 1 I frame and 1 P frame, and can be expressed in the following formulas:

$$BV\_MIN = 2R/rp;$$

$$BV\_MAX = 2R*(1/ri + 1/rp)$$

Therefore, the present invention can set the capacity of the video data buffer 311 in the transmitter system 310 as RV_MAX and that of the video data buffer 321 in the receiver system 320 as BV_MAX, and can set values of the first and the second predetermined levels accordingly. Meanwhile, since the video data buffer 321 of the receiver system 320 only has the data quantity of two image frames, the maximum instantaneous data flow is R/ri of the I frame, and the average data flow is R*(1/ri+1/rp). The predetermined level can thus be set as R*(1/ri+1/rp) in the present invention.

In summary, the present invention provides the data transmission method and the audio/video system capable of splitting and synchronizing audio/video data, which can provide audio and video synchronization when the audio data and the video data transmitted from the same source are played in different systems. Furthermore, the present invention can be applied in a home theater system capable of playing the video data and the audio data by a projector and a speaker set, respectively.

Those skilled in the art will readily observe that numerous modifications and alterations of the device and method may be made while retaining the teachings of the invention.

What is claimed is:

1. A data transmission method for a transmitter system and a receiver system splitting and synchronizing audio/video data, comprising the steps of:
   (a) initializing a transmitter system and a receiver system for establishing a wireless connection;
   (b) processing the video data to form processed video data in the transmitter system and transmitting the processed video data via a first path according to a video data playing notification message received from the receiver system;
   (c) processing the audio data in the transmitter system and transmitting the audio data via a second path according to a deviation signal for synchronizing the audio data and the video data and the video data playing notification message received from the receiver system;
   (d) receiving and processing the processed video data and the audio data in the receiver system for generating corresponding video output data and audio output data; and
   (e) outputting the video output data from the receiver system to a video output apparatus and outputting the audio output data from the receiver system to an audio output apparatus.

2. The method of claim 1 further comprising:
   generating the deviation signal in the receiver system according to data time of the video output data played by the video output apparatus and data time of the audio output data played by the audio output apparatus.

3. The method of claim 1, wherein the transmitter system comprises a first video data buffer and initializing the transmitter system in step (a) comprises:
   obtaining a predetermined compression ratio and a first predetermined capacity corresponding to the first video data buffer;
   initializing a network of the transmitter system;
   transmitting dummy data from the transmitter system to the receiver system;
   receiving bandwidth information in the transmitter system corresponding to a reception state of the dummy data;
   setting the predetermined compression ratio and the first predetermined capacity in the transmitter system according to the bandwidth information; and
   transmitting a video data reception notification message from the transmitter system to the receiver system.

4. The method of claim 3, wherein transmitting the dummy data from the transmitter system to the receiver system is transmitting the dummy data from the transmitter system to the receiver system when the wireless connection between the transmitter system and the receiver system has been established successfully.

5. The method of claim 4, wherein initializing the transmitter system in step (a) further comprises reinitializing the network of the transmitter system when the wireless connection between the transmitter system and the receiver system has not yet been established successfully.

6. The method of claim 3, wherein initializing the transmitter system in step (a) further comprises:
   determining whether the wireless connection between the transmitter system and the receiver system has been established successfully.

7. The method of claim 3, wherein setting the predetermined compression ratio and the first predetermined capacity in the transmitter system according to the bandwidth information is setting the predetermined compression ratio and the first predetermined capacity in the transmitter system according to the bandwidth information when a system clock of the transmitter system and a system clock of the receiver system are synchronized.

8. The method of claim 7, wherein transmitting the dummy data from the transmitter system to the receiver system is transmitting the dummy data from the transmitter system to the receiver system when the system clock of the transmitter system and the system clock of the receiver system are not yet synchronized.

9. The method of claim 3, wherein initializing the transmitter system in step (a) further comprises:
   determining whether a system clock of the transmitter system and a system clock of the receiver system are synchronized with each other.

10. The method of claim 3, wherein initializing the transmitter system in step (a) further comprises:
    preparing to acquire the video data and the audio data after transmitting the video data reception notification message to the receiver system.

11. The method of claim 1, wherein initializing the receiver system in step (a) comprises:
    initializing a network of the receiver system;
    receiving dummy data in the receiver system from the transmitter system;
    generating bandwidth information in the receiver system according to a reception state of the dummy data;
    transmitting the bandwidth information from the receiver system to the transmitter system; and
    beginning to receive the data from the transmitter system after receiving a video data reception notification message from the transmitter system.

12. The method of claim 11, wherein initializing the receiver system in step (a) further comprises:
    reinitializing the network of the receiver system when the wireless connection between the transmitter system and the receiver system has not yet been established successfully.

13. The method of claim 11, wherein initializing the receiver system in step (a) further comprises:

determining whether the wireless connection between the transmitter system and the receiver system has been established successfully; and determining whether the receiver system has received the video data reception notification message.

14. The method of claim 1, wherein the transmitter system comprises a first video data buffer and processing the video data in the transmitter system in step (b) comprises:

obtaining a predetermined compression ratio and a first predetermined capacity corresponding to the first video data buffer;

compressing the acquired video data according to the predetermined compression ratio;

storing the processed video data into the first video data buffer; and transmitting the video data after the video data playing notification message has been received and a data quantity of data stored in the first video data buffer is greater than the first predetermined capacity.

15. The method of claim 14, wherein processing the video data in the transmitter system in step (b) further comprises:

allowing transmission of the audio data if the video data playing notification message has been received and the data quantity of the data stored in the first video data buffer is greater than the first predetermined capacity.

16. The method of claim 1, wherein the transmitter system comprises an audio data buffer and processing the audio data in the transmitter system in step (c) comprises:

storing the acquired audio data in the audio data buffer;

receiving a playing clock of the video output apparatus and the deviation signal;

adjusting a predetermined data flow and a predetermined data quantity when transmitting the audio data according to the playing clock of the video output apparatus and the deviation signal;

transmitting a playing clock of the audio output apparatus to the receiver system; and transmitting the audio data with the predetermined data flow and the predetermined data quantity.

17. The method of claim 16, wherein processing the audio data in the transmitter system in step (c) further comprises:

stopping transmission of the audio data when transmission of the audio data is forbidden.

18. The method of claim 1, wherein processing the video data in the receiver system in step (d) comprises:

storing the received video data in a second video data buffer of the receiver system; and decompressing the processed video data to generate the video output data if a data quantity of data stored in the second video data buffer is greater than a third predetermined level.

19. The method of claim 18, wherein processing the video data in the receiver system in step (d) further comprises:

generating the deviation signal, the video data playing notification message, and a notification message in the receiver system corresponding to a video playing system clock.

20. A video and audio system capable of splitting and synchronizing audio/video data comprising:

a transmitter system comprising:
a first video processing unit for receiving the video data from a video and audio input apparatus and processing the video data to form processed video data according to a predetermined compression ratio;
a first audio processing unit for receiving the audio data from the video and audio input apparatus and processing the audio data;
a first video data buffer for storing the processed video data;
a first wireless unit for transmitting the processed video data via a wireless path;
a first wired unit for transmitting the audio data via a wired path; and
a control device for controlling transmission of the processed video data and the audio data according to a deviation signal for synchronizing the audio data and the video data; and a receiver system comprising:
a second wireless unit for receiving the processed video data wirelessly from the transmitter system;
a second wired unit for receiving the audio data on wire;
a second video processing unit for processing the processed video data to generate corresponding video output data; and
a second audio processing unit for processing the audio data to generate corresponding audio output data;

wherein the deviation signal are generated by the receiver system according to data time of the video output data and data time of the audio output data.

* * * * *